United States Patent [19]

Peterson et al.

[11] Patent Number: 5,319,970
[45] Date of Patent: Jun. 14, 1994

[54] CONTINUOUSLY CURVED STRUT MOUNTED SENSOR

[75] Inventors: Michael T. Peterson; Jeffrey M. Setterholm, both of Lakeville, Minn.; C. Michael Peterson, Cedar Rapids, Iowa; Jonathan D. Young, Worthington; William J. Leeper, Huber Heights, both of Ohio

[73] Assignee: Rosemount, Inc., Eden Prairie, Minn.

[21] Appl. No.: 867,183
[22] PCT Filed: Mar. 22, 1991
[86] PCT No.: PCT/US91/01927
    § 371 Date: Jun. 22, 1992
    § 102(e) Date: Jun. 22, 1992
[87] PCT Pub. No.: WO92/16849
    PCT Pub. Date: Oct. 1, 1992
[51] Int. Cl.⁵ ............................................. G01P 5/165
[52] U.S. Cl. ............................................ 73/182; 73/180; 73/861.65
[58] Field of Search ............ 73/180, 182, 183, 861.65, 73/861.66, 861.67, 861.68

[56] References Cited

U.S. PATENT DOCUMENTS

| | | | |
|---|---|---|---|
| 2,204,367 | 6/1940 | Kollsman | 73/212 |
| 3,163,040 | 12/1964 | Werner | 73/212 |
| 3,318,146 | 5/1967 | De Leo et al. | 73/180 |
| 3,482,445 | 12/1969 | De Leo et al. | 73/182 |
| 4,096,744 | 6/1978 | De Leo et al. | 73/180 |
| 4,378,696 | 4/1983 | De Leo et al. | 73/182 |
| 4,378,697 | 4/1983 | DeLeo | 73/182 |
| 4,378,697 | 4/1983 | De Leo et al. | 73/182 |
| 4,615,213 | 10/1986 | Hagen | 73/180 |
| 4,645,517 | 2/1987 | Hagen et al. | 73/182 |
| 4,718,273 | 1/1988 | McCormack | 73/180 |
| 4,836,019 | 6/1989 | Hagen et al. | 73/180 |
| 5,025,661 | 6/1991 | McCormack | 73/180 |

FOREIGN PATENT DOCUMENTS

WO92/16849 10/1992 PCT Int'l Appl. .
WO92/16849 10/1992 PCT Int'l Appl. .

Primary Examiner—Donald O. Woodiel
Attorney, Agent, or Firm—Westman, Champlin & Kelly

[57] ABSTRACT

An air data sensor (10) for mounting on an air vehicle (14), the outer end (11) is spaced outwardly from a surface of the air vehicle (14), a mounting base (12) and an outer end (11) which is provided with sensing ports (21, 22) for sensing air data parameters, the body (32) of the sensor (10) is made so that when viewed in the bisecting plane of the body (32), the inner and outer edges (34, 36) of the body curve continuously from the outer end (11) to the base (12). These edges (34, 36) diverge from adjacent to the outer end (11) to the base (12) to provide a very smooth streamlined probe (10) which tends to reduce drag.

11 Claims, 8 Drawing Sheets

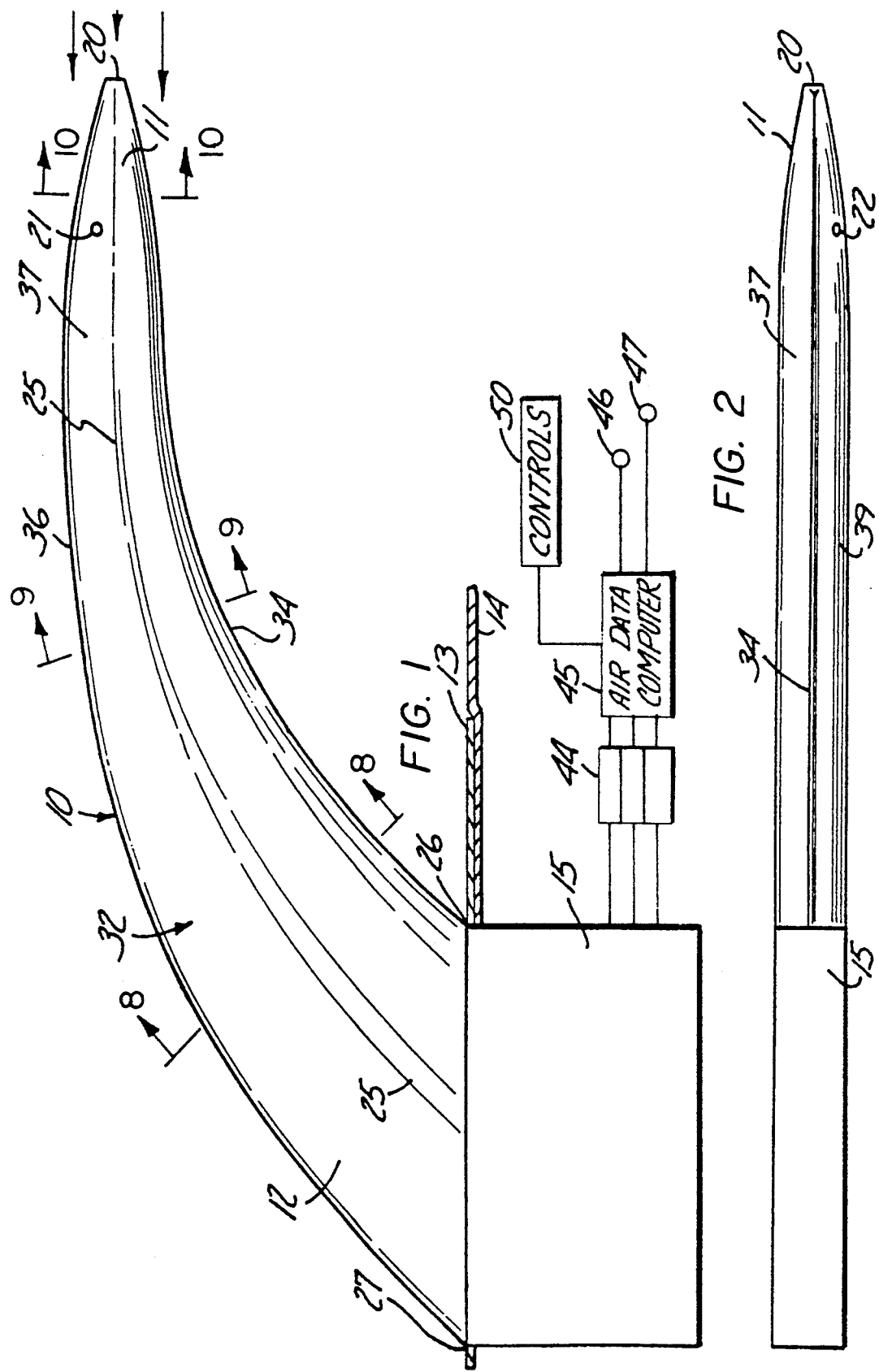

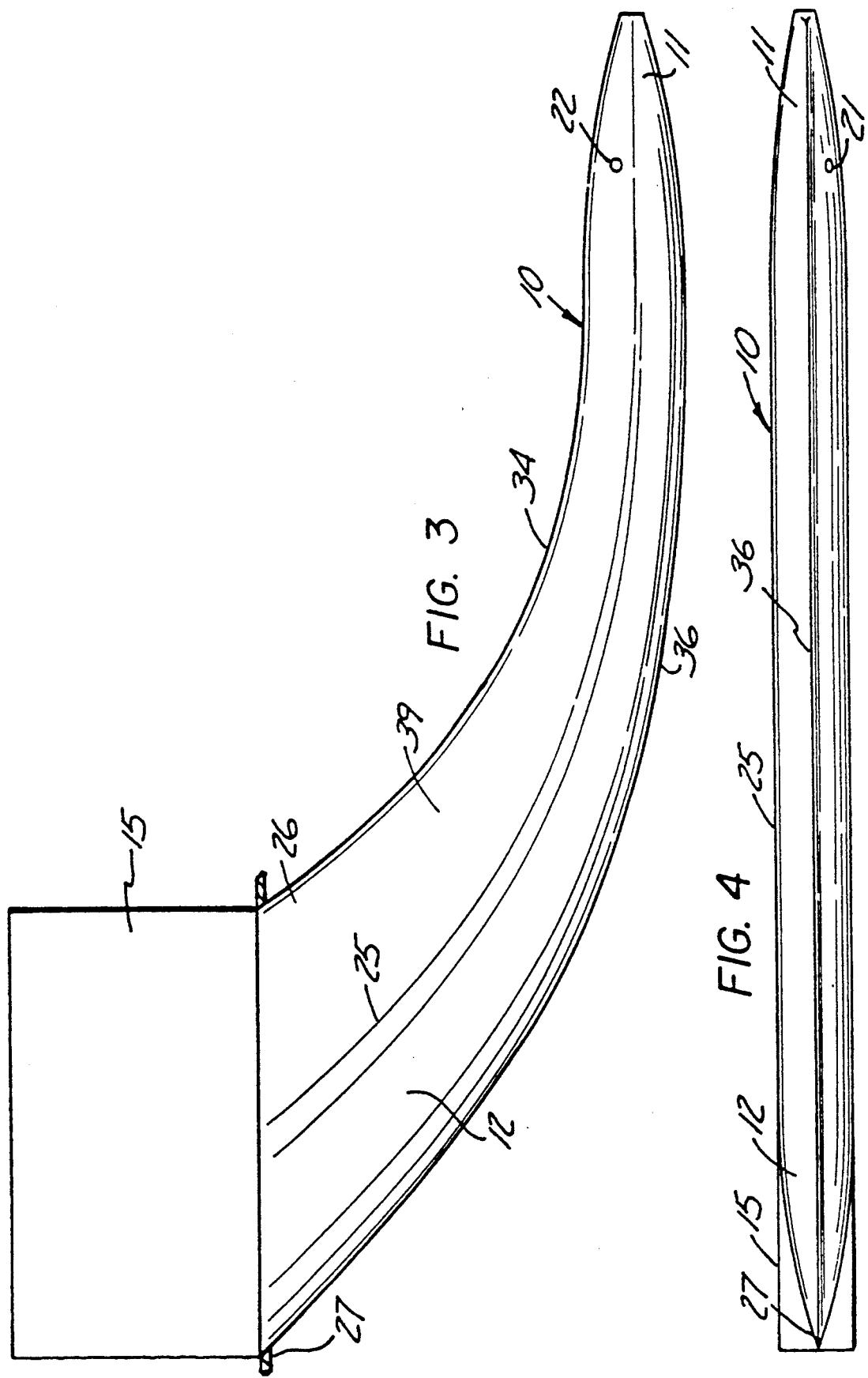

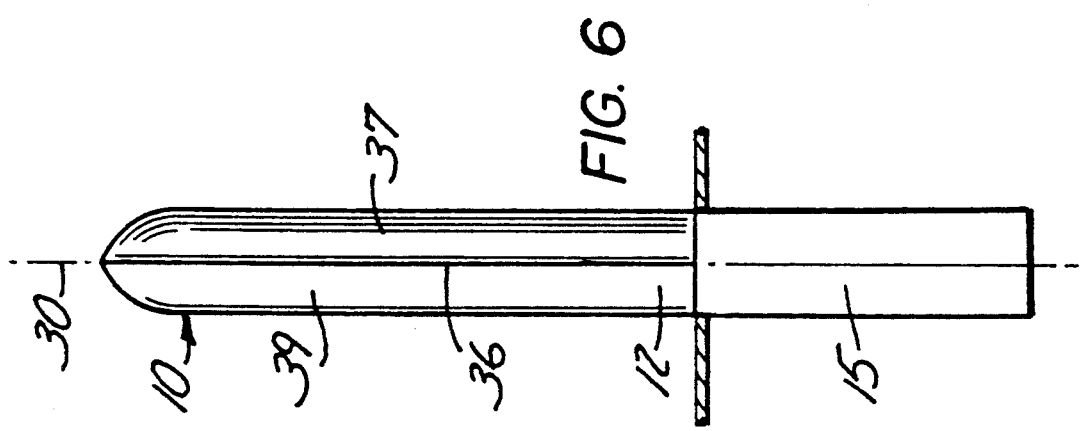
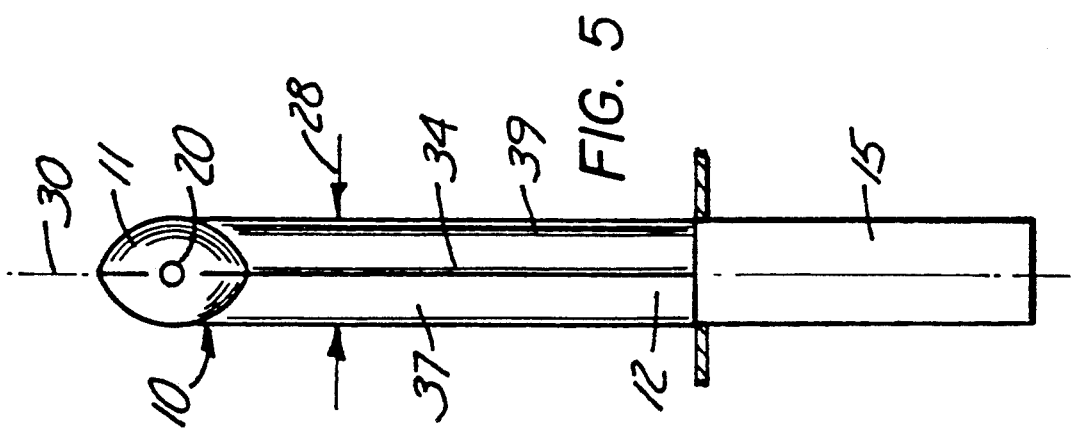

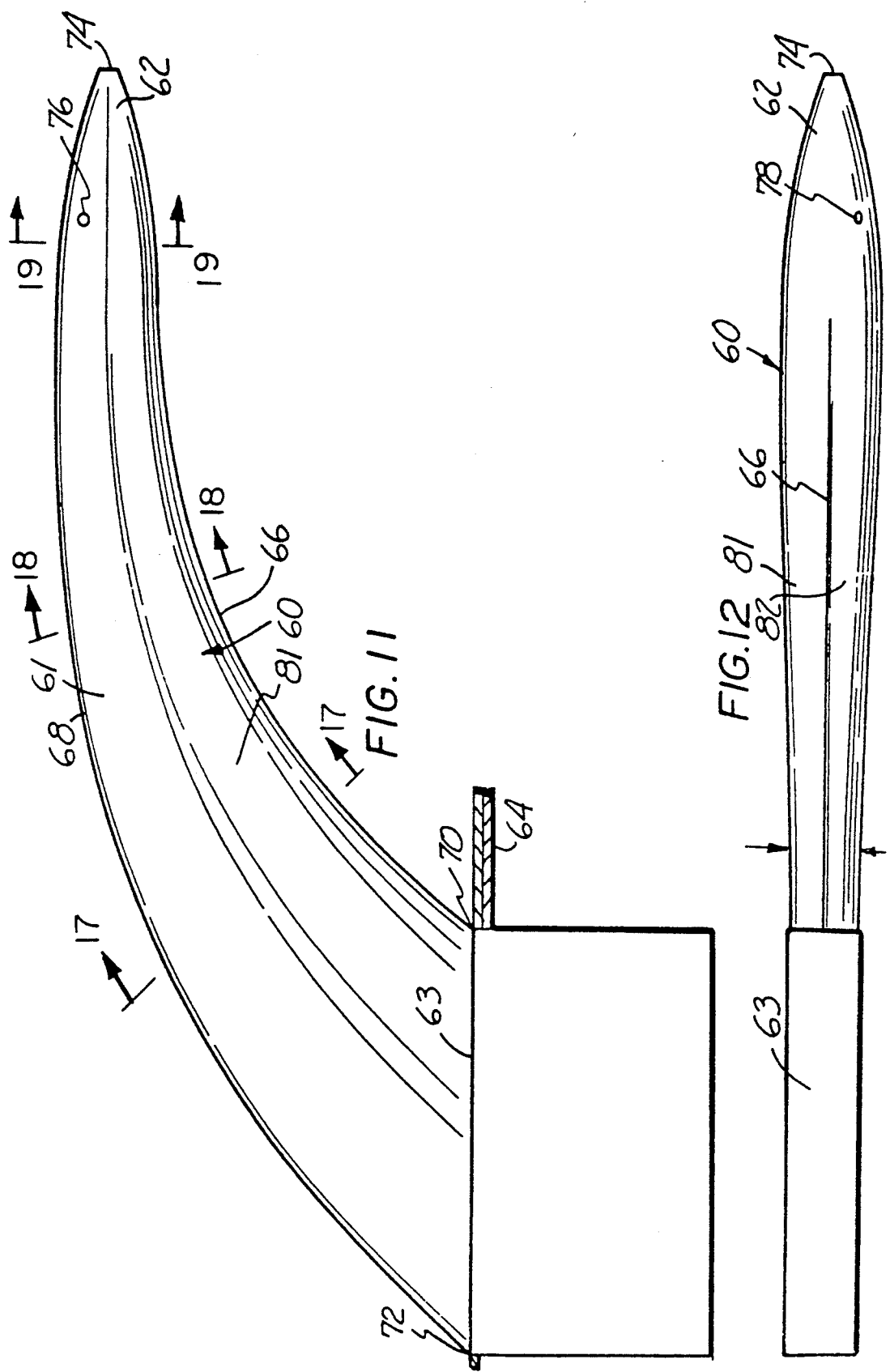

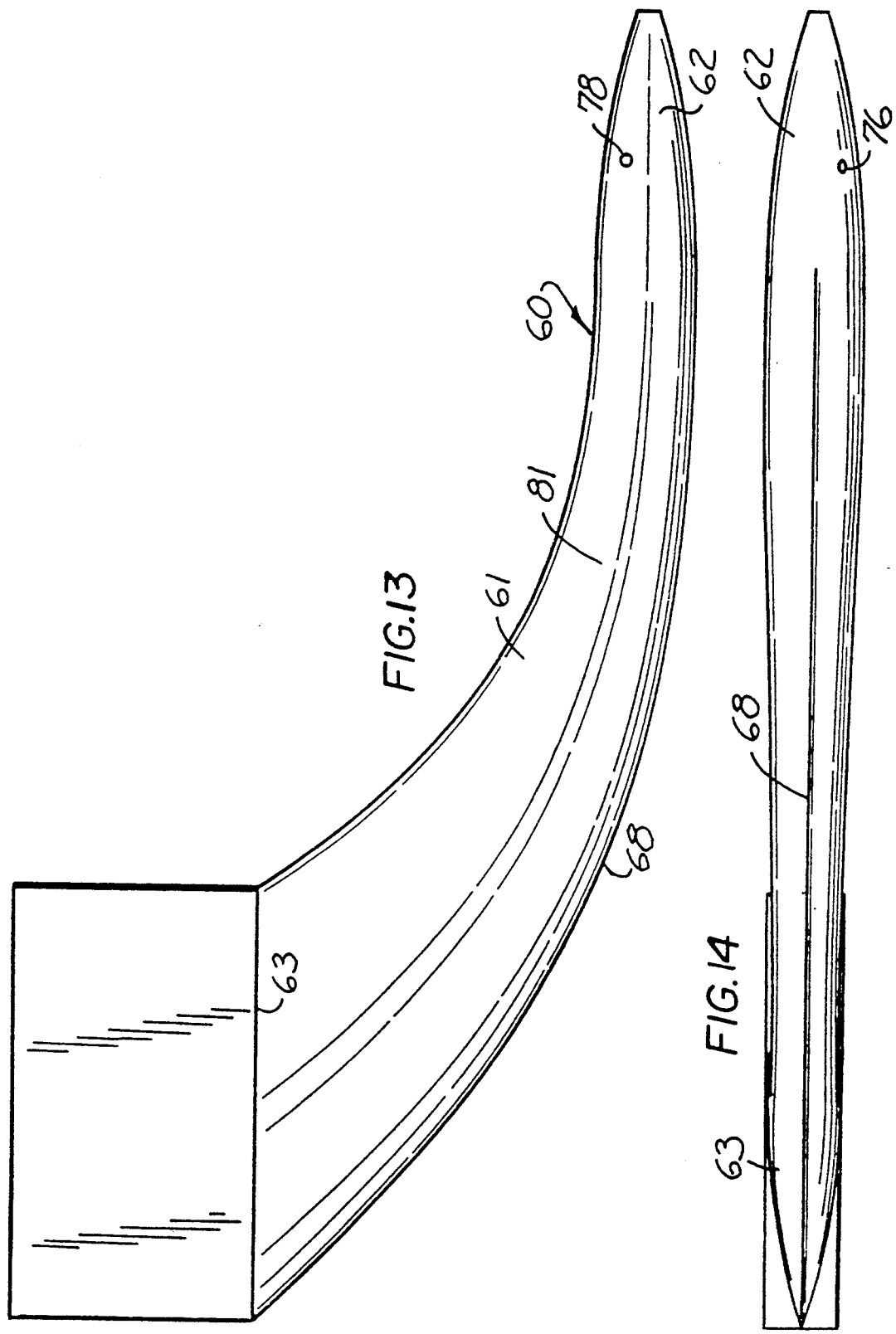

CONTINUOUSLY CURVED STRUT MOUNTED SENSOR

BACKGROUND OF THE INVENTION

The present invention relates to a probe for mounting onto a side surface of an air vehicle having an upstream facing end having ports for sensing air data parameters. The probe outer end is offset outwardly from the surface of the vehicle. The probe has a reference bisecting plane which extends outwardly from the surface of the vehicle at the base end of the probe and which extends in fore and aft direction of the air vehicle. The probe has a continuously smoothly curved configuration on both its inner and outer sides when viewed in the reference plane. The continuous curvature of the inner and outer sides or edges extends from the outer end of the probe to the base where it mounts to the air vehicle.

Strut mounted probes are now widely used on air vehicles. Such probes include a barrel portion and a laterally extending strut portion that supports the barrel at a position spaced from a mounting surface of the air vehicle. Such a construction is shown in U.S. Pat. No. 4,378,696. The strut in this patent has a generally ogival shape, while the barrel is generally cylindrical, and the two parts are fixed together at an abrupt junction. The structure shown in Patent '696 includes signal compensation surfaces but the general strut mounting is one that is conventional.

U.S. Pat. No. 4,836,019 illustrates a compact air data sensor that has an outer shell with internal passageways being formed to communicate air data pressure sensing signals to suitable instrumentation. Instrumentation generally includes differential pressure sensors, and an air data computer that is calibrated for providing desired signals such as pitot pressure, and angle of attack signals as well as static pressure in many instances.

Another typical probe is shown in U.S. Pat. No. 3,318,146. This probe includes a multiple orifice, part spherical outer end in which the air data sensing ports are formed.

SUMMARY OF THE INVENTION

The present invention relates to an air data sensing probe construction that is generally considered to be of the "strut" mounted type wherein a sensing end of the probe faces forwardly into the airstreams and has ports therein for sensing air data parameters, while a base end is mounted to a side of an aircraft so that the sensing end is spaced laterally or outwardly from the surface on which the base is mounted.

In the present invention, the body of the sensor continuously curves and tapers from its outer end to a base when viewed in a bisecting plane extending outwardly from the mounting surface and passing through the probe body. Specifically the inner and outer edges and sides of the body curve continuously from the base to the outer end, and converge toward a smaller size at the outer end. The body curve is made to accommodate different cross-sectional shaped outer ends but generally the cross section of the main portion of the body is "ogival" shaped or it could be termed a tangent ogive shape because of the sharp front and rear edges. The main portion is of a substantially uniform thickness, while in the dimensions measured in the bisecting plane of the body, the body tapers from the smaller outer end to a larger dimension at the base. The smooth, continuous curve of the side edges provides for improved performance characteristics, less turbulence causing irregularities and requires less "blending" of different cross sectional shapes and configurations in the region of the laterally extending portions of the body.

BRIEF DESCRIPTION OF THE DRAWINGS

FIG. 1 is a top plan view of an air data sensor made according to the present invention showing schematically its mounting on an air vehicle and typical schematic illustrations of instrumentation used therewith;

FIG. 2 is a side elevational view of the air data sensor shown in FIG. 1 as viewed from an inner side thereof;

FIG. 3 is a bottom plan view of the air data sensor of FIG. 1;

FIG. 4 is a side elevational view of the air data sensor shown in FIG. 3;

FIG. 5 is an end elevational view as viewed from a forward end thereof, that is an upstream end in relation to air flow;

FIG. 6 is a rear elevational view thereof;

FIG. 11 is a top plan view of a modified form of the present invention;

FIG. 12 is a side elevational view from an inner side of the device of FIG. 11;

FIG. 13 is a bottom view of the device of FIG. 11;

FIG. 14 is an outer side view of the device shown in FIG. 11;

DETAILED DESCRIPTION OF THE PREFERRED EMBODIMENTS

Figure 7:
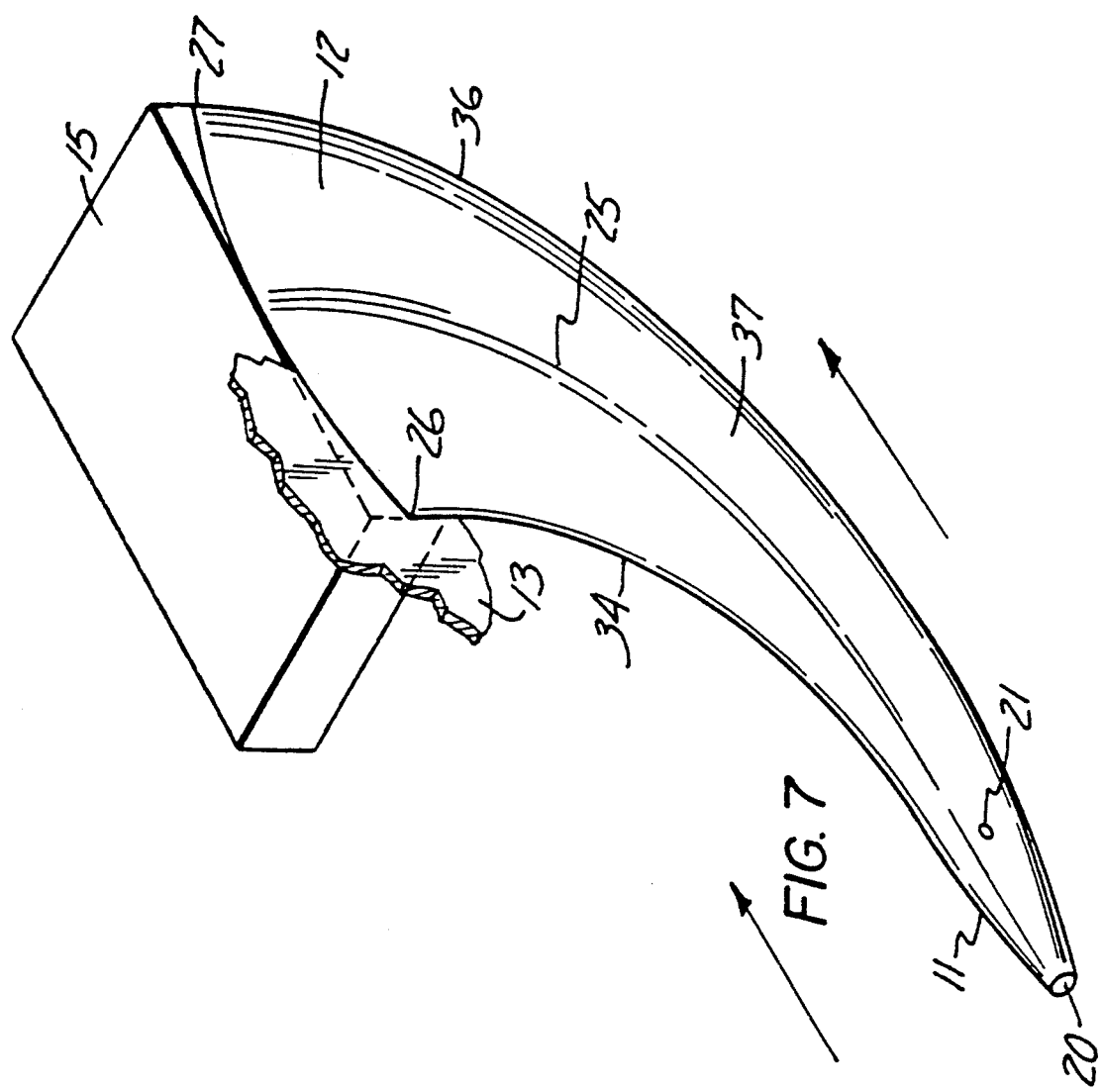
FIG. 7 is a perspective view of the air data sensor shown in FIG. 1 as viewed from an upper forward end thereof.

An air data sensor or probe made according to the present invention is indicated generally at 10 and includes an outer end portion 11, and a base portion 12 that has suitable flange mountings indicated at 13 for mounting onto the skin of an air vehicle 14. The mounting flange 13 can be conventionally installed in a known manner to the air vehicle. A suitable mounting block 15 is part of the mounting and contains suitable air signal conduits, or connections, for connecting conduits carrying pressure or pneumatic signals sensed to suitable instrumentation.

The outer end of the probe, as shown, has a pitot port 20, as is conventional and can have one or more pressure sensing ports 21, on the upper side of the probe body, and one or more 22 on the lower side, shown in FIG. 3. Ports 21 and 22 have central axes that can be oriented in desired orientations relative to the reference plane to achieve the measurements which are to be made. Sensing ports are conventionally used as is illustrated in the prior art probes mentioned above. As shown, the ports are offset from a plane passing through axial line 25 on the leading end of the probe and perpendicular to the bisecting center plane of the probe, but other orientations of the ports can be provided. A curved center line 25 of the probe extends from the axis of the forward end of the probe where port 20 is formed to the central point at the base end 12, midway between a leading corner 26 and a trailing corner 27 of the base portion 12. The center line is straight near the leading end 11 and then curves back toward the base 12.

As can be seen in FIGS. 5 and 6 as well as in FIGS. 2 and 3, the body has a maximum depth dimension at the center of the probe which is relatively constant throughout its length. This depth or thickness dimension is shown at 28 in FIG. 5. The reference bisecting plane is indicated at 30. This is a bisecting plane perpendicular to the depth dimension 28. Plane 30 is a reference plane for orientation of the ports 21 and 22, for example. The configuration of the probe body 32 when viewed in this reference plane is shown in FIGS. 1 and 2. The probe has an inner, generally leading edge or side 34, and an outer edge or side 36. The edge 36 extends from the leading end of the probe 11, in a continuous curve back to point 27 where the edge joins the base portion 12 at the aircraft skin 14. The inner or leading (upstream facing) edge 34 also is made in a substantially continuous curve (without angular changes) from the leading end 11 back to the corner 26 of the probe. Edges 34 and 36 diverge from the leading end of the probe back to the base so that the dimension between corners 26 and 27 is substantial to provide adequate strength and rigidity for mounting the probe.

Figure 8:
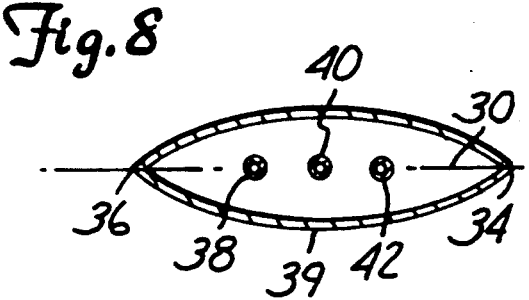
FIG. 8 is a sectional view taken as on line 8—8 in FIG. 1.
Figure 9:
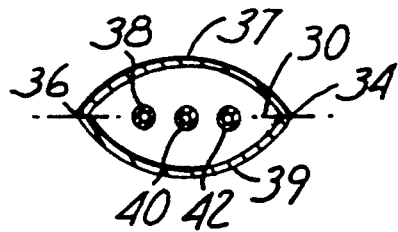
FIG. 9 is a sectional view taken as on line 9—9 in FIG. 1.
Figure 10:
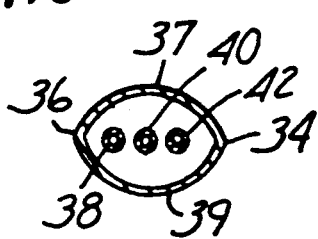
FIG. 10 is a sectional view taken as on line 10—10 in FIG. 1.

The ogival or tangent ogive cross sectional shape is shown in FIGS. 8, 9 and 10. The probe has upper and lower walls with convex surfaces 37 and 39 respectively, that taper from the center down to the edges 34 and 36 from a center line of maximum convexity midway between edges 34 and 36. The convex surfaces smoothly curve to follow the curve of the edges as well as being smoothly convex. The surfaces thus are compound curves. Lines perpendicular to the reference plane 30 and passing through curvedly center axial line 25 midway between edges 34 and 36 lie along the line of maximum convexity, as shown. The maximum convexity could be shifted from the center line, if desired. The edges 34 and 36 define reference plane 30, as shown.

Suitable pneumatic conduits indicated schematically at 38, 40 and 42, can be provided for carrying the desired pressure signals from the sensing ports to instrumentation. The forward end of the probe can have an internal pneumatic system such as that shown on U.S. Pat. No. 4,836,019 for receiving fluid pressure signals from the respective ports and for connecting to the conduits leading back to instrumentation in the air vehicle. As shown in FIG. 1, the instrumentation typically includes differential pressure sensors 44, which feed information into an air data computer 45. The air data computer in turn drives indicators 46 and 47 for indicating angle of attack, air speed, or static pressure. The computer also can be used to directly control the air vehicle through control systems shown schematically at 50.

The probe construction is a unitary body forming a surface mounted, laterally offset probe with the outer end of the probe spaced from the mounting surface sufficiently to permit sensing air data parameters, and which continuously smoothly curves from the outer end to a base that mounts on the air vehicle wall or surface. The inner and outer sides edges diverge from the outer end in smooth, continuous curves when viewed in a plane bisecting the probe along its major dimensions and central, long axis. The probe can have substantially the same height or thickness in direction perpendicular to the reference plane along its length, except for the forward portion where it tapers downwardly to define the leading end port as shown in FIG. 2.

In FIG. 11 through 19, a second form of the invention is shown, which includes a probe 60 having a body 61, with an outer sensing end 62 and a base end 63 mounted onto a surface of a wall of an air vehicle indicated at 64. In this form of the invention, the outer sensing end portion 62 is a circular cross section cylindrical section from about where the sight lines 19, 19 are located in FIG. 11, into a generally ogival cross sectional shape in its thickness direction. The ogival shape has continuously curved side surfaces or edges illustrated at 66 and 68 respectively. The inner or upstream edge 66 curves continuously from the cylindrical outer end to a corner 70 where edge 66 joins the surface 64. Outer edge 68 curves from the cylindrical cross section to a corner 72 where it joins surface 64.

The tip of the cylindrical end portion 62 transitions into a generally conical shape which surrounds and defines a central pitot pressure sensing port 74. Top and bottom ports 76 and 78 for sensing static pressure, angle of attack or other pressure parameters desired also are included.

In this form of the invention, the thickness or height of the probe is slightly larger at the leading end, as shown because of the cylindrical configuration and it tapers downwardly to less height at the base line 63. The ogival cross-section shape of the first form of the invention also can have a thickness dimension that is greater near the outer end of the probe and use an internal pneumatic system, such as that shown in U.S. Pat. No. 4,836,019.

Figure 16:
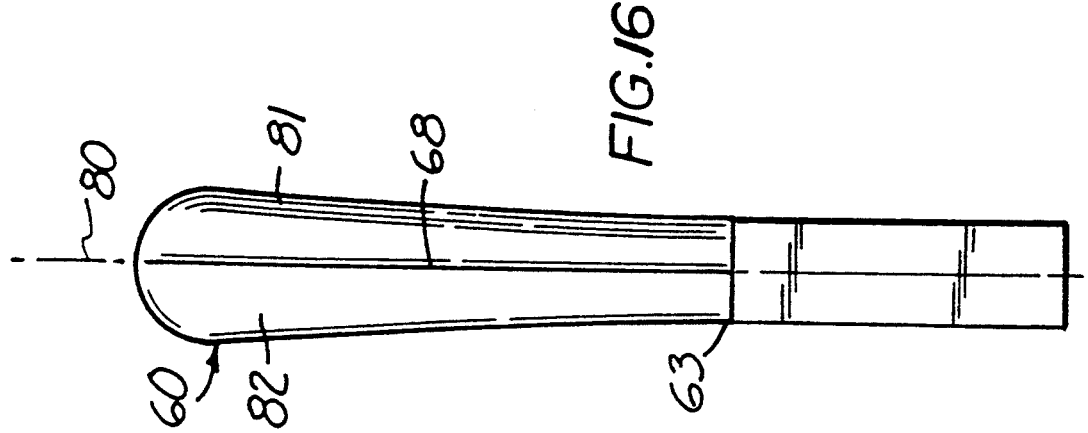
FIG. 16 is a rear elevational view of the device of FIG. 11.
Figure 15:
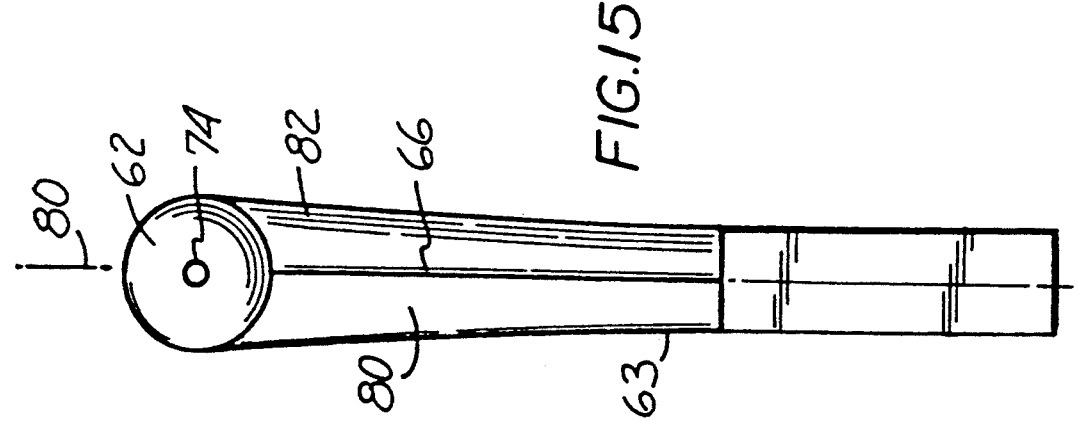
FIG. 15 is a front elevational view of the device of FIG. 11.

Again, viewed in its reference plane, which is indicated at 80 in FIGS. 15 and 16, and as seen in FIGS. 11 and 13, both of the sides or edges 66 and 68 continuously curve from the forward cylindrical end to the base 63. The inner and outer edges of the probe diverge from the base outwardly to the outer end as well. The curves of the edges are formed differently, but both smoothly transition to the base.

Figure 17:
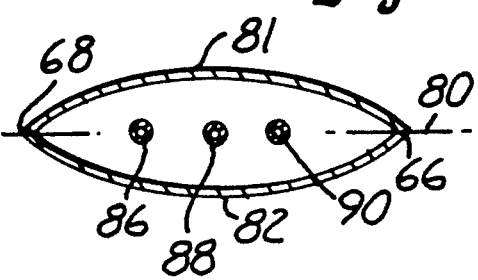
FIG. 17 is a sectional view taken as on line 17—17 in FIG. 11.
Figure 18:
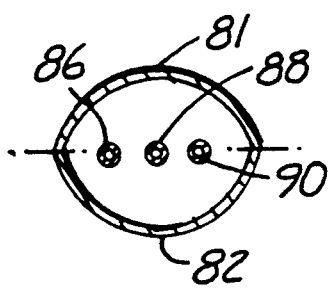
FIG. 18 is a sectional view taken as on line 18—18 in FIG. 11.
Figure 19:
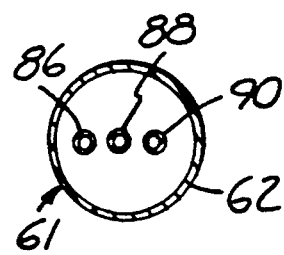
FIG. 19 is a sectional view taken as on line 19—19 in FIG. 11.

The sectional views in FIG. 17, 18 and 19 illustrate conduits 86, 88 and 90, for carrying pressure signals as in the first form of the invention. The signals can be delivered to suitable instrumentation, as shown in FIG. 1, and it can be seen that the cross sectional change occurs from a cylindrical outer section to generally ogival shape adjacent to the base.

The upper and lower surfaces 81 and 82, are compound curves convex surface that not only curve with the inner and outer edges, but also smoothly taper down from the maximum thickness, at the center or mid line of the surface of the probe. The smooth compound curves of the surfaces 80 and 82 of the probe avoid turbulence and lower drag.

The upper and lower surfaces 81 and 82 of both forms of the invention are convex and curved smoothly along their length to follow the curve of the edges as well as remaining convex along their lengths.

Although the present invention has been described with reference to preferred embodiments, workers skilled in the art will recognize that changes may be made in form and detail without departing from the spirit and scope of the invention.

What is claimed is:

1. A pressure sensing probe for mounting on a surface of an air vehicle comprising: a probe body;
   a mounting base end on said probe body adapted to be supported on the air vehicle surface;
   a sensing end on the probe body spaced laterally from the air vehicle surface and extending forwardly of the mounting end, said body having a height and a width defined by inner and outer side edges, the side edges defining a bisecting reference plane;
   the body inner edge when viewed in the reference plane curving continuously from the outer end to the base, and the inner and outer edges diverging from the outer end to the base.

2. The air data sensor of claim 1 wherein the probe body has at least one port means thereon at its outer end for sensing air data parameters.

3. The air data sensor of claim 1 wherein the air data sensor has a generally tangent ogive cross section from adjacent its outer end to its base end when viewed in a cross sectional plane generally perpendicular to the reference plane.

4. The air data sensor of claim 1 wherein there are pressure sensing port means defined in an upper surface and a lower surface of said air data sensor, said surfaces being on opposite sides of the reference plane.

5. The air data sensor of claim 1 wherein the probe has a Pitot pressure port defined in a leading end of the probe.

6. The air data sensor of claim 1 wherein the outer end of the probe has a generally cylindrical cross sectional shape, and the probe has a generally ogival cross sectional shape adjacent to the base when viewed in a viewing plane perpendicular to the reference plane.

7. The air data sensor of claim 1 wherein a central plane is defined by lines passing through a central axis of the probe and perpendicular to the reference plane, and a first air data sensor port on an upper side of the probe on a first side of the central plane, and a second air data sensor port on a lower side of the probe, and on a second side of said central plane.

8. The air data sensing probe of claim 1, wherein the inner and outer edges of the probe are formed as generally sharp edges by joining upper and lower surfaces, and wherein said edges define a plane parallel to the reference plane, said upper and lower surfaces being smoothly curved in convex form between the inner and outer edges and also being curved to follow the curve of the continuous edges.

9. An air data sensing probe for mounting on a surface of an air vehicle comprising a sensing end and a mounting end, said sensing end having pressure sensing ports thereon for measuring air data parameters, and said mounting end being adapted for mounting onto the surface of an air vehicle with the sensing end spaced laterally from the surface mounting the probe, wherein the improvement comprises a probe body diverging in a first direction from the sensing end to the mounting end such that a mounting plane of the surface of the air vehicle is generally parallel to a central axis of the probe at the sensing end, and wherein the probe body curves in at least one plane of measurement along inner and outer sides continuously from the mounting end to the sensing end.

10. The air data sensing probe of claim 9 wherein said body has a generally ogival cross sectional shape in a plane perpendicular to a bisecting plane of the sensor extending between the inner and outer sides, and wherein said ogival shape forms inner and outer edges lying on the bisecting plane that are curved substantially continuously from the sensing end to the base end.

11. The air data sensing probe of claim 9 wherein the probe has inner and outer edges at the inner and outer sides, the convex surfaces being smoothly curved to follow the curve of the inner and outer edges such that the maximum convexity of the respective surfaces lies along central curved lines on the respective surfaces substantially midway between the inner and outer edges.

* * * * *